US009250826B2

(12) United States Patent
Fromm

(10) Patent No.: US 9,250,826 B2
(45) Date of Patent: Feb. 2, 2016

(54) ENHANCED PERFORMANCE MONITORING METHOD AND APPARATUS

(71) Applicant: Silicon Graphics International Corp., Fremont, CA (US)

(72) Inventor: Eric Carl Fromm, Eau Claire, WI (US)

(73) Assignee: Silicon Graphics International Corp., Milpitas, CA (US)

(*) Notice: Subject to any disclaimer, the term of this patent is extended or adjusted under 35 U.S.C. 154(b) by 398 days.

(21) Appl. No.: 13/801,841

(22) Filed: Mar. 13, 2013

(65) Prior Publication Data

US 2014/0281181 A1    Sep. 18, 2014

(51) Int. Cl.
G06F 13/00    (2006.01)
G06F 3/06    (2006.01)
G06F 11/30    (2006.01)
G06F 11/34    (2006.01)

(52) U.S. Cl.
CPC ........ *G06F 3/0653* (2013.01); *G06F 11/3006* (2013.01); *G06F 11/3096* (2013.01); *G06F 11/3476* (2013.01)

(58) Field of Classification Search
CPC .......... G06F 11/3096; G06F 11/30006; G06F 11/3006; G06F 11/3476
See application file for complete search history.

(56) References Cited

U.S. PATENT DOCUMENTS

2014/0149751 A1* 5/2014 Baysah et al. ................ 713/300

OTHER PUBLICATIONS

Bandyopadhyay, Shibdas, A Study on Performance Monitoring Counters in x86-Architecture, Indian Statistical Institute, 43 pages, Fall 2004.

* cited by examiner

*Primary Examiner* — Edward Dudek, Jr.
(74) *Attorney, Agent, or Firm* — Sunstein Kann Murphy & Timbers LLP

(57) ABSTRACT

A high-performance-computer system includes a statistics accumulation apparatus configured to efficiently accumulate system performance data from a variety of system components, and periodically write such data to processor local memory for efficient subsequent software processing of the thus acquired data, thereby reducing the system hardware and software overhead needed for collection of such data as compared to prior art systems.

16 Claims, 11 Drawing Sheets

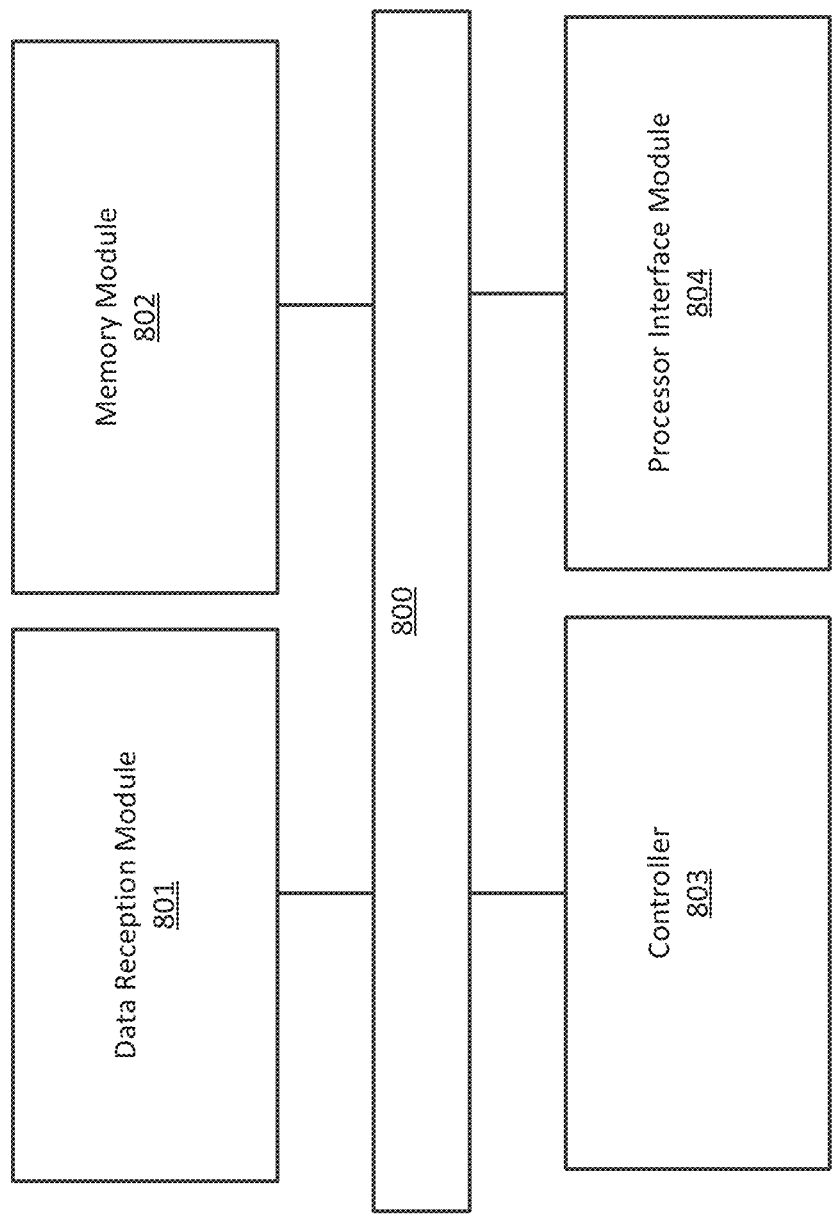

ENHANCED PERFORMANCE MONITORING METHOD AND APPARATUS

TECHNICAL FIELD

The present invention relates to high-performance computer systems, and more particularly to performance monitoring within high-performance computer systems.

BACKGROUND ART

It is known in the prior art to include on integrated circuit components of high-performance computer systems, one or more registers configured to record data associated with various events or operations occurring within the device. Such registers may record the number of times an event occurs. In some cases, such registers may record the time (e.g., number of clocks) for which a specified condition is true.

The data recorded in such registers may be useful in monitoring the performance of a processor or other components of the high-performance computer system, or of a program executing on a processor. As such, the processor may periodically read the data from such registers, and analyze the data to assess system hardware or software performance. To that end, the registers must be coupled to the processor via, one or more communications lines, such via dedicated communications lines, or via a data bus.

Both the registers and the communications lines impose a hardware cost on the component integrated circuit. For example, the registers are typically composed of flip-flops, and must be large enough to store the maximum possible value of data recorded during an acquisition period. Such registers are physically large, and in the aggregate may also consume significant amounts of power. For example, some high-performance computer systems may have hundreds of registers, or even one thousand or more such registers, disposed across a given integrate circuit component.

SUMMARY OF THE EMBODIMENTS

A first embodiment provides a computer processing system having one or more processors and the associated local memory logically coupled to each such processor as well as some optional number of other component integrated circuits. A given processor or other integrated circuit device in the system may also have a plurality of performance monitoring components distributed throughout the device and a statistics accumulation apparatus including a plurality of prescalers with each of the plurality of prescalers coupled a corresponding one of the performance monitoring components. The device also has a random access buffer memory having a plurality of memory locations, each of the plurality of memory locations corresponding to a corresponding one of the plurality of prescalers. The random access buffer memory may be an SRAM and is used to periodically accumulate a sum of successive prescaler values for each associated performance monitoring component. The statistics accumulation apparatus also includes control logic coupled to the plurality of prescalers and to the random access buffer memory, the control logic configured to controllably transfer data from each of the plurality of prescalers adding the prescaler data to a corresponding one of plurality of random access buffer memory locations. The prescalers serve to buffer data between the plurality of performance monitoring components and the random access buffer memory.

An alternate embodiment provides a computer processing system having a processor and a local memory logically coupled to the processor. The system also has a plurality of performance monitoring components distributed throughout the computer processing system; along with a statistics accumulation apparatus including a plurality of prescalers, each of the plurality of prescalers coupled to a corresponding one of the performance monitoring components. The system also has a random access buffer memory having a plurality of memory locations, each of the plurality of memory locations corresponding to a corresponding one of the plurality of prescalers. The random access buffer memory may be an SRAM, and is separate from the processor's local memory. The system also includes control logic coupled to the plurality of prescalers and to the random access buffer memory, the control logic configured to controllably transfer data from each of the plurality of prescalers to corresponding one of the plurality of memory locations. The prescalers buffer data between the plurality of performance monitoring components and the random access buffer memory.

The control logic may take a variety of forms. For example, the control logic may be a state machine. In some embodiments, the processor comprises a memory controller configured to read data from a buffer memory into local processor memory.

The prescalers and the random access buffer memory may be disposed on a hub chip within a high performance computer system. In some systems, each of the plurality of prescalers is physically closer to the random access buffer memory than to its corresponding one of the plurality of performance monitoring components.

In some embodiments, each of the plurality of performance monitoring components is logically coupled to a corresponding one of the plurality of prescalers by a corresponding one of a plurality of dedicated data channels.

In some systems, the random access buffer memory includes a summing buffer having a plurality of summing buffer memory locations, each of the summing buffer memory locations corresponding to a corresponding one of the plurality of prescalers, the summing buffer configured to accumulate data from the plurality of prescalers; and a staging buffer having a plurality of staging buffer memory locations, each of the staging buffer memory locations corresponding to a corresponding one of the plurality of prescalers, the staging buffer configured to accumulate data from the plurality of prescalers and data from the summing buffer, and to provide that data to the processor. Indeed, in some systems, the summing buffer has a summing buffer input and a summing buffer output, and the staging buffer has a staging buffer input, and the system also includes an input multiplexer having a plurality of inputs and an output, each of the plurality of inputs corresponding to a corresponding one of the plurality of performance monitoring components via a corresponding one of the prescalers; and an adder having a first adder input, a second adder input, and an adder output, the first adder input logically coupled to the multiplexer output, the second adder input logically coupled to the summing buffer output, and the adder output logically coupled to the staging buffer input and to the summing buffer input. The adder is configured to sum data from one of the prescalers with corresponding data from the summing buffer, and to send the data to the summing buffer and to the staging buffer under control from the control logic.

In addition, some systems include an address generator (e.g., a counter) configured to synchronously supply address data to the summing buffer, the staging buffer, and the input multiplexer.

In another embodiment, a method for operating a computing system includes generating performance data from a plurality of performance monitoring components; buffering the performance data in a corresponding plurality of prescalers; transferring the performance data from the plurality of prescalers to a corresponding plurality of memory locations within a random access buffer memory; and transferring the performance data from the plurality of memory locations within the random access buffer memory to a processor-local memory, wherein the processor-local memory is separate from the random access memory.

In some embodiments, the step of transferring the performance data from the plurality of prescalers to a corresponding plurality of memory locations within a random access buffer memory includes aggregating the performance data from the plurality of prescalers with data from the corresponding plurality of memory locations within a random access memory to produce a plurality of aggregated data; and writing the plurality of aggregated data back to the corresponding plurality of memory locations within a random access buffer memory. Indeed, in some embodiments the steps of summing the performance data and writing the aggregated data back to the corresponding plurality of memory locations occurs within a single clock period.

In some embodiments, the random access buffer memory includes a summing buffer and a staging buffer; and summing the performance data from the plurality of prescalers with data from the corresponding plurality of memory locations within a random access memory to produce a plurality of aggregated data includes summing the performance data from the plurality of prescalers with data from a corresponding plurality of memory locations within the summing buffer, the step of transferring the performance data from the plurality of prescalers to a corresponding plurality of memory locations within a random access memory includes transferring the performance data from the plurality of prescalers to a corresponding plurality of memory locations within the summing buffer during a first phase of operation within an acquisition cycle, and transferring the performance data from the plurality of prescalers to a corresponding plurality of memory locations within the staging buffer during a second phase of operation of an acquisition cycle, the second phase of operation following the first phase of operation in the acquisition cycle.

In yet another embodiment, a computer processing system has a central processing unit including a processor, and a plurality of performance monitoring components distributed throughout the computer processing system, and the system further includes a data storage means having means for receiving stimulus data from the plurality of performance monitoring components; and memory means for accumulating stimulus data from the plurality of performance monitoring components via the means for receiving stimulus data. The system also has control means coupled to the means for receiving stimulus data and to the memory means, the control means configured to controllably transfer data from the means for receiving stimulus to the memory means. In operation, the means for receiving stimulus buffers data between the plurality of performance monitoring components and the memory means.

The control means may take a variety of forms. For example, the control means may be state machine, or may be a programmed microprocessor.

In some embodiments, the means for receiving stimulus data and the memory means are disposed on a hub chip within a high performance computer system.

In some embodiments, the memory means includes a summing buffer means having a plurality of summing memory locations, each of the memory locations corresponding to one of the plurality of performance monitoring components, and a staging buffer means having a plurality of staging memory locations, each of the staging memory locations corresponding to a corresponding one of the plurality of means for receiving stimulus data, the staging buffer means configured to accumulate data from the plurality of means for receiving stimulus data and data from the summing buffer means, and to provide that data to the processor. Indeed, in some systems the summing buffer means has a summing buffer means input and a summing buffer means output, and the staging buffer means has a staging buffer means input, and the system further includes an input multiplexer means having a plurality of inputs and a multiplexer output, each of the plurality of inputs corresponding to a corresponding one of the plurality of performance monitoring components; and an adder means having a first adder input, a second adder input, and an adder output, the first adder input logically coupled to the multiplexer output, the second adder input logically coupled to the summing buffer means, and the adder output logically coupled to the staging buffer input and to the summing buffer input. In operation, the adder means is configured to sum data from one of the means for receiving stimulus data with corresponding data from the summing buffer means, and to send the data to the summing buffer means and to the staging buffer means under control from the control means. In some embodiments, the system also includes an address generation means configured to synchronously supply address data to the summing buffer means, the staging buffer means, and the input multiplexer means.

BRIEF DESCRIPTION OF THE DRAWINGS

The foregoing features of embodiments will be more readily understood by reference to the following detailed description, taken with reference to the accompanying drawings, in which:

FIG. 8 schematically illustrates a system diagram of an illustrative stimulus data system.

DETAILED DESCRIPTION OF SPECIFIC EMBODIMENTS

Various embodiments provide methods and systems for more efficiently monitoring the performance of a high-performance computer system ("HPC"). These methods and systems reduce the hardware burden inherent in prior art register systems, and allow faster, more convenient access to the desired data.

In various embodiments, a plurality of prescalers act as buffers between sources of performance monitoring data, and a random access memory ("RAM"). Each prescaler collects performance data and stores that data until the data is transferred from the prescaler to a corresponding memory location in the RAM. The RAM serves as a central repository for data from the prescalers, and stores the data until it is read by a processor (e.g., a central processing unit, or "CPU") for analysis, or transferred to system memory. The RAM is more cost effective, and occupies less space in a computer system, than a constellation of individual prior art registers for storing such performance monitoring data.

A high-performance computer system may include a plurality of processors and various other components that coordinate the activity of those processors.

System Architecture

Figure 1:
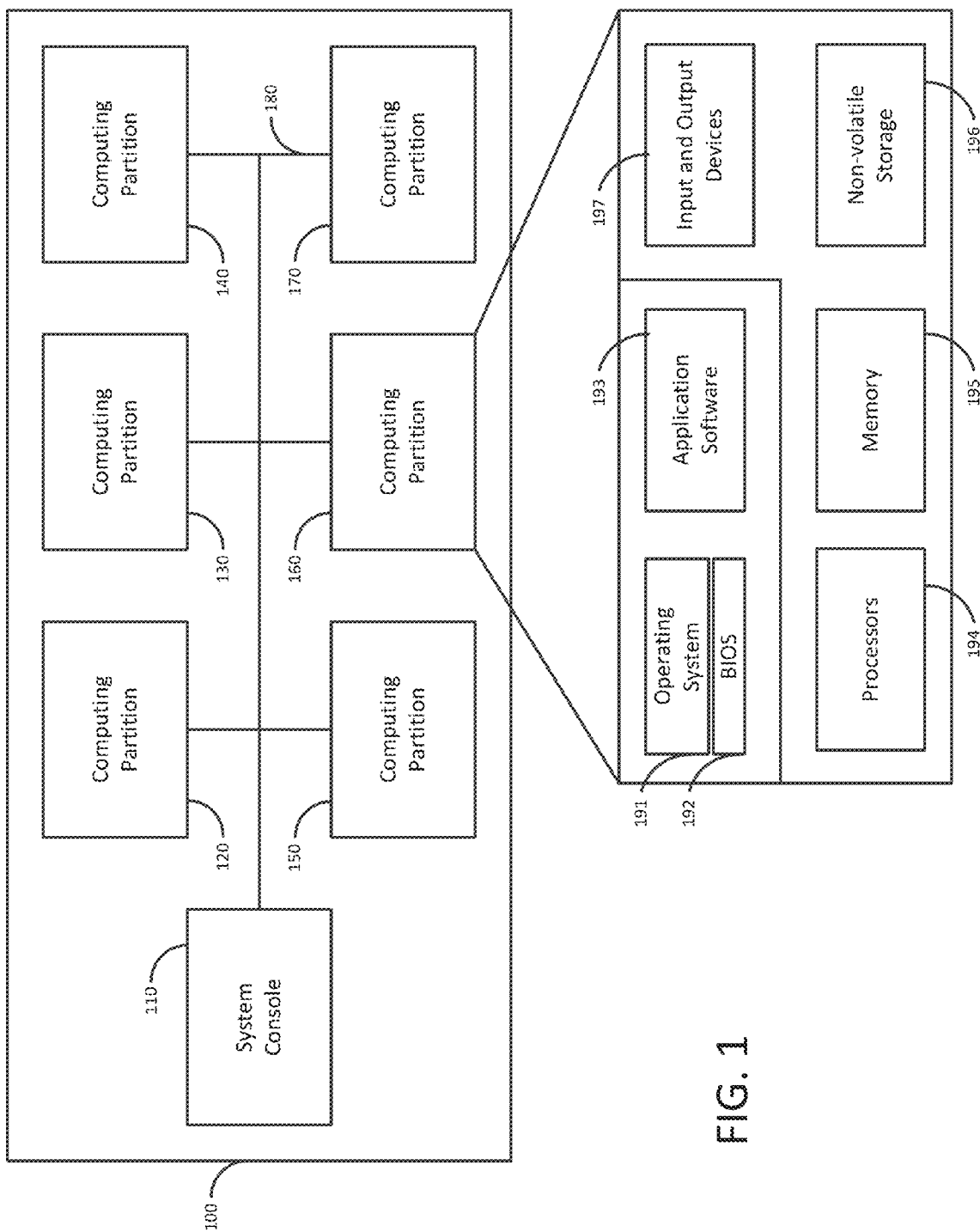
FIG. 1 is schematically illustrates a logical view of an HPC system in accordance with one embodiment of the present invention.

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a. Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
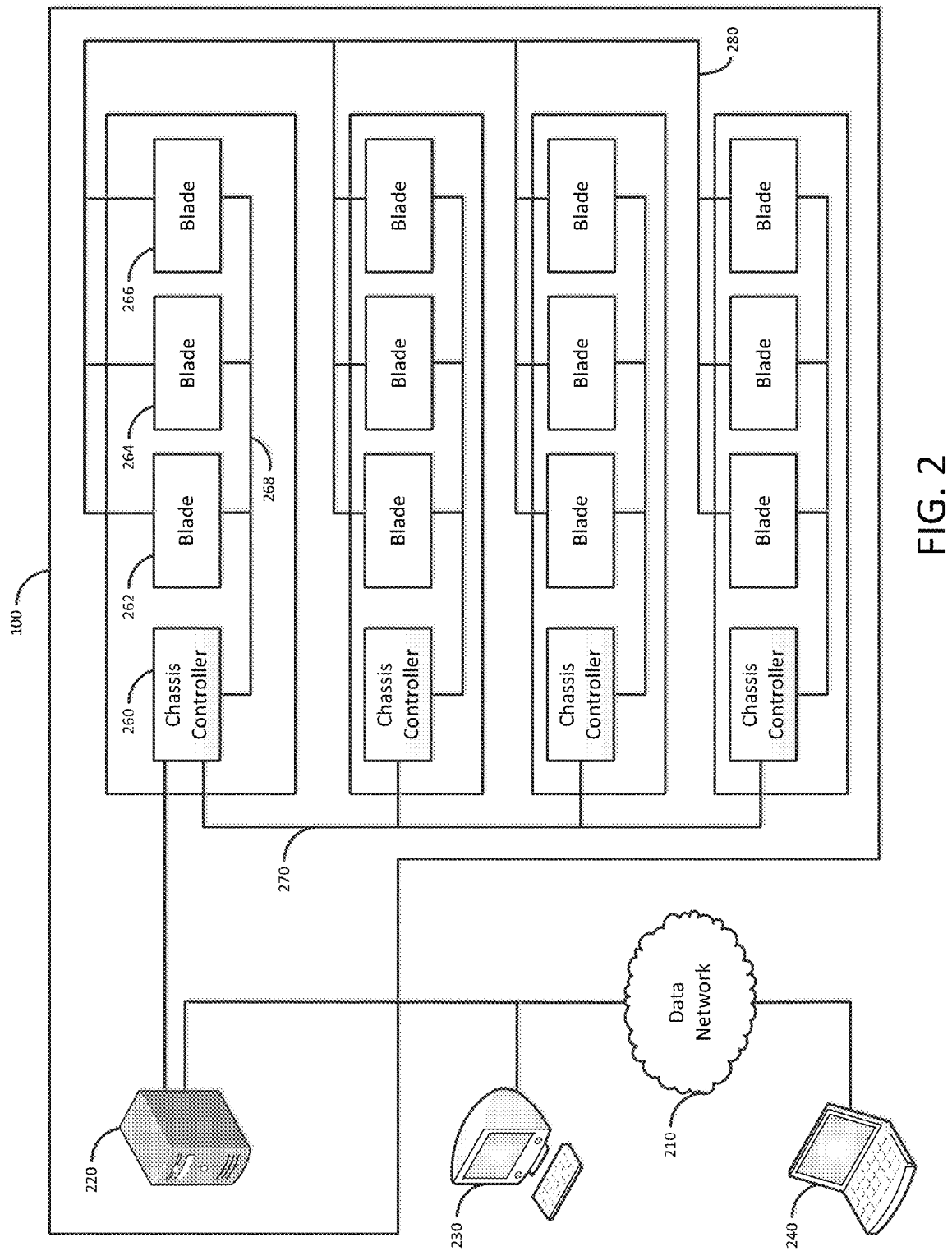
FIG. 2 schematically illustrates a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which, may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the Unix secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
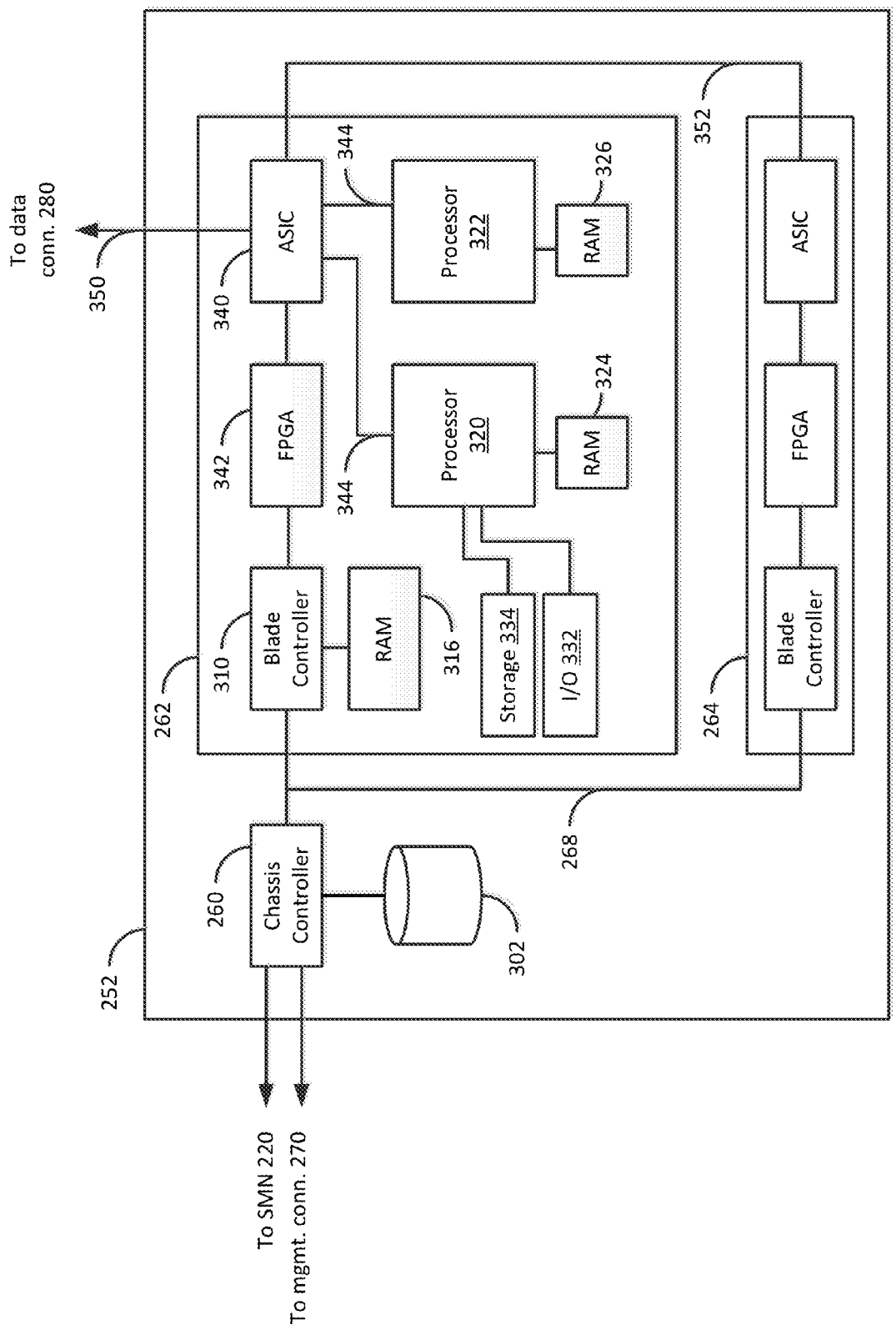
FIG. 3 schematically illustrates details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 311 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326 (each of which may be referred to as "local RAM" or "processor local RAM"). Blade 262 may be alternately configured so that multiple processors may access a common set of RAM on a single bus, as is known in the art. It should also be appreciated that processors 320, 322 may include any number of central processing units ("CPUs") or cores, as is known in the art. Further, each processor (e.g., 320, 322) may have one or more local memory controllers (320A). The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example. Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HIV system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

In view of their complexity, some high-performance computer systems monitor various aspects of system performance by collecting data ("performance data") from elements within the system. Such data may be referred to, collectively, as "stimuli" and individually as a "stimulus" from a source of stimulus data (or merely "source").

An item of stimulus may be a single bit of data, or a word having several bits of data. For example, a single bit of data may indicate merely that an event occurred and may be produced by a circuit that is involved in the event, or that monitors the occurrence of the event. A multiple-bit word may carry information about an event that has occurred. In some embodiments, a multiple-bit word may carry information about the current state of a system resource. For example, if a source is a first-in first-out (i.e., "FIFO") buffer having multiple data locations, the status of the buffer at a given time might use several bits to report the number of locations in the buffer holding data at that particular time.

In the prior art, each source of stimuli had an associated register adjacent to the source, configured to capture the stimuli produced by the source. A processor occasionally read the stimulus data from the individual registers.

Such configurations presented a variety of drawbacks. First, each register had to be large enough to capture the largest possible value accumulated before the register was read by the processor. In addition, the larger the register, the more data lines required to communicate the data to the processor. The data lines, in turn, occupied die space (or "real estate," e.g., surface area of an integrated circuit) and complicated data line routing in the integrated circuit on which the source of stimulus resides. These factors forced the system designer into an undesirable trade-off: to keep registers and data lines small, the frequency of processor reads had to be increased, thus interrupting and degrading processor performance. Alternately, to avoid frequent processor reads of the registers, the size of the registers and the size and routing complexity of the associated data lines had to be increased.

As system sizes increased, the impact of these issues increased. For example, a modern HPC may have a constellation of several thousand sources of stimuli on each integrated circuit component, such that the overhead associated with the circuits and processes for gathering stimuli, is tremendously costly.

FIGS. 4A, 4B, 5A and 5B illustrate, in increasing levels of detail, various embodiments illustrate alternate approaches to gathering such data.

Figure 4A:
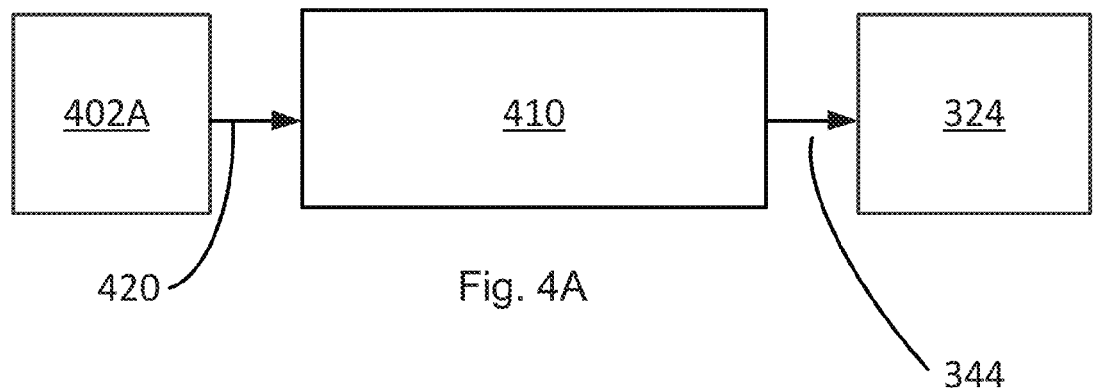
FIGS. 4A and 4B schematically illustrate embodiments of stimulus data systems.
Figure 4B:
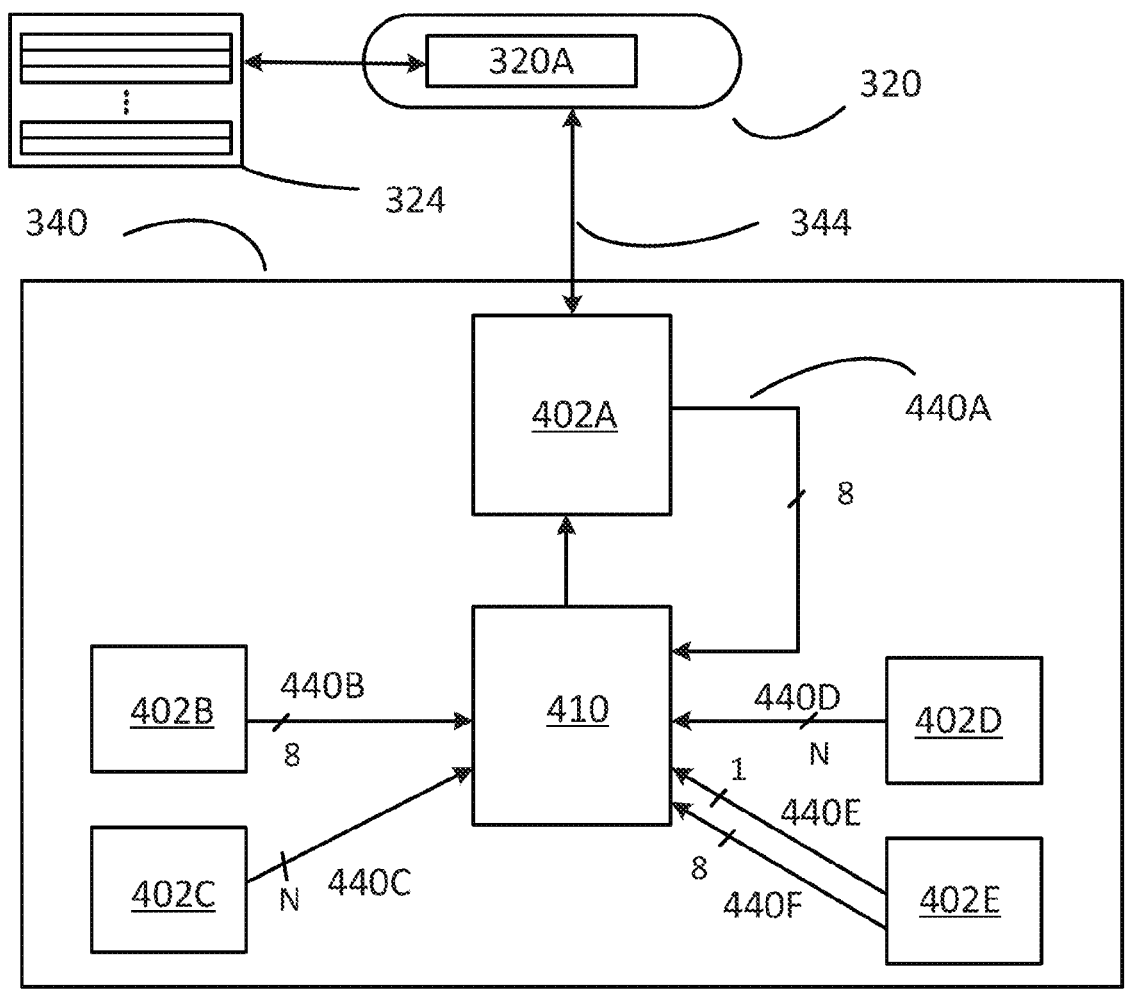

Overview: FIGS. 4A and 4B

As shown in FIGS. 4A and 4B, in contrast to prior art systems, various embodiments interpose centralized data storage apparatus 410 (which may also be known as a "statistics accumulation apparatus") between the various sources of stimuli (e.g., 402A, 402B, etc., which may be referred to as "performance monitoring components") and the local memory (in this example, RAM 324) associated with processor (320), to store the stimulus data until the processor (in this example, processor 320) or other system element is ready to retrieve it. In illustrative embodiments, the sources of stimuli will be illustrated as being on a common integrated circuit—and specifically, on a Hub chip—but the sources could be located at various locations throughout a system. The stimulus data may be referred to as "statistics," and a data storage apparatus may be referred to as a "statistics accumulation apparatus."

As schematically illustrated in FIG. 4A, a stimulus source is logically coupled to data storage apparatus 410. Unlike prior art systems, in the embodiment of FIG. 4A, there is no local register near source 402A for storing stimulus data produced by source 402A, and/or dedicated data lines running from such a local register to the processor (e.g., 320) or a processor's local memory (e.g., 324). Rather, the stimulus data from source 402A is stored (along with data from the other sources) in the centralized data storage apparatus 410. To that end, data storage apparatus 410 includes circuitry logically coupled to the source 402A by a first set of data lines 420 In some embodiments, the data lines 420 may be dedicated to transferring data from the source 402A to the data storage apparatus 410, and are not an addressable data bus serving multiple sources or other components of the system. In other words, in some embodiments, the data lines 420 are data channels dedicated exclusively to transferring data from the source 402A to the data storage apparatus 410. The data storage apparatus 410 is logically coupled to the processor 320, and/or to processor local memory 324, by a data bus 344.

In operation, the source 402A provides stimulus data to the data storage apparatus 410, and the data storage apparatus 410 accumulates data supplied by the source 402A until the accumulated stimulus data is read out of the data storage apparatus 410, for example to the processor-local memory 324 (e.g., under the controller of a memory controller 324).

FIG. 4B schematically illustrates a more detailed example including a source 402A of stimulus data within a hub chip 340. In this embodiment, the source 402A is a processor interface unit, configured to communicate data between the hub chip 340 and the processor 320. The processor interface unit 402A tracks various aspects of its own operation, which may include such data as the quantity of data sent from the hub chip 340 to the processor to name but one example. Such data, by its nature, will be multi-bit data. Other sources may produce single-bit data (e.g., to signal the occurrence of an event).

The processor interface unit 402A periodically provides its multi-bit data to data storage apparatus 410 via dedicated data lines 440A (just as do the other sources). In this example, the stimulus produced by the processor interface unit 402A is an 8-bit word, and so datalines 440A are 8 bits wide. Other sources (e.g., 402B, 402C, 402D, 402E, etc.) are similarly logically coupled to data storage apparatus 410 by associated data lines (e.g., 440B, 440C, 440n, 440E, etc.), each with a width (N) equal to the width of the data being produced by its associated source. For example, data 440B has a width of 8 bits. Some data sources, such as data source 402E for example, pay produce more than one data output to the data storage apparatus 410. For example, a first data output from data source 402E may be a single bit of data on line 440E to indicate that an event has occurred, while a second data output from data source 402E may be 8 bits of information on lines 440F indicating the status of a FIFO buffer, for example.

In the example of FIG. 4B, the data storage apparatus 410 accumulates the data, to record the cumulative quantity of the stimulus data from processor interface unit 402A, and holds that cumulative data until it is transferred to processor local memory 324.

A More Detailed Embodiment

Figure 5A:
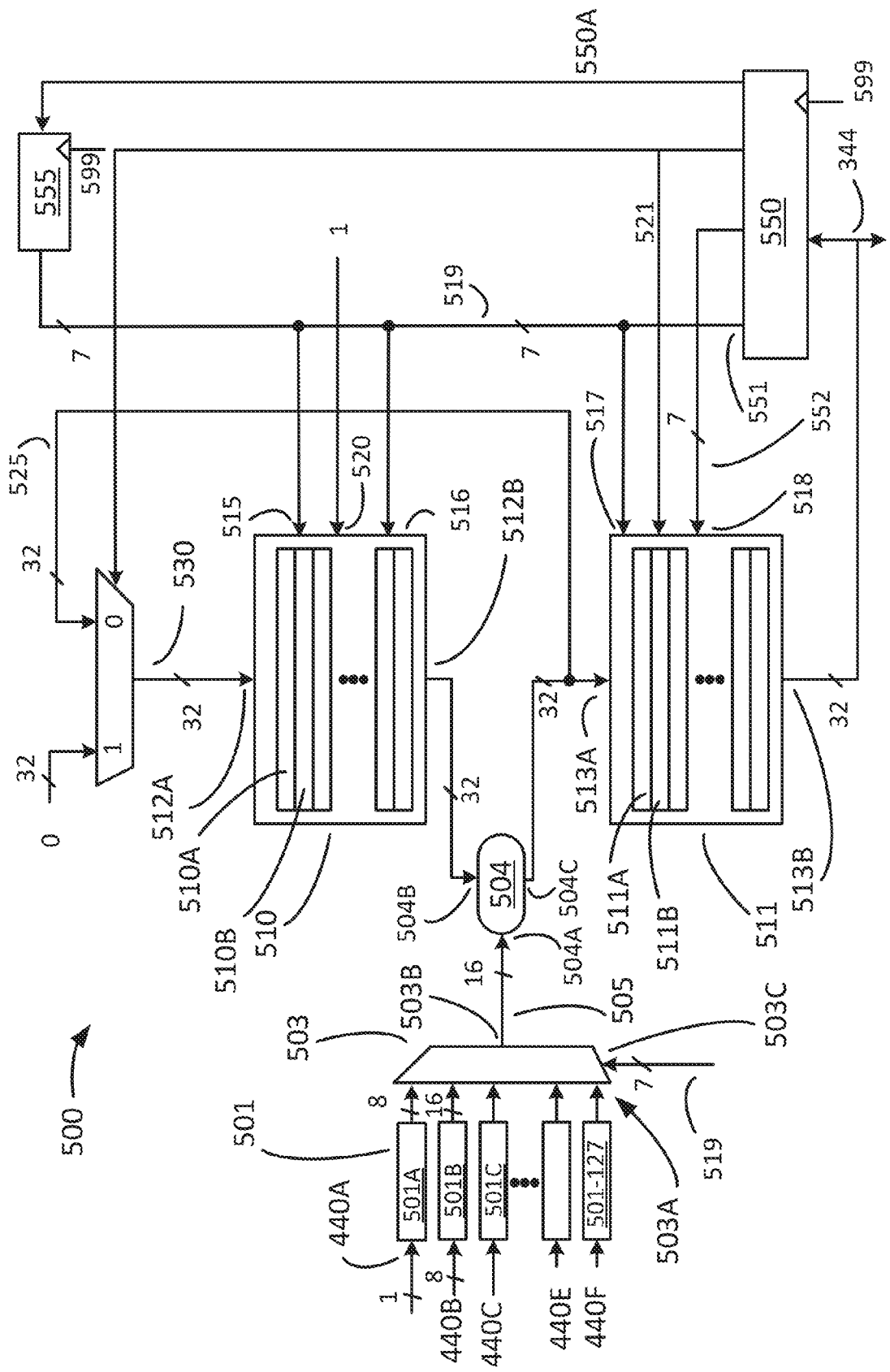
FIG. 5A schematically illustrates an embodiment of a stimulus data system.

FIG. 5A schematically illustrates a still more-detailed embodiment of a data storage apparatus (or "statistics accumulation apparatus") 500. Data storage apparatus 500 includes an array 501 of data reception registers (501A, 501B, etc.—which may be referred to as "prescalers," and are generically referred to herein as "501X"), each corresponding to a single source of stimulus data (e.g., 402A, 402B, etc.—generically referred to herein as "402X"). Each data reception register (501X) receives stimulus data from its corresponding source (402X) and stores or accumulates that data. Generally, each data reception register (501X) is smaller than a data register in the prior art, but is at least large enough (i.e., has sufficient capacity) to store or accumulate all of the data produced by its corresponding source in a period of time, as described below.

Each data reception register (501X) is logically coupled to a corresponding input of the multiplexer 503. To that end, the multiplexer 503 has a number of multiplexer inputs 503A, and a multiplexer control input 503G. The multiplexer 503 also has a multiplexer output 503B that is logically coupled to an adder 504 via data lines 505. In this example, some of the data reception registers (prescalers) have a width of 8 bits (e.g., 501A), while others have a width of 16 bits (e.g., 501B). As such, the multiplexer 503 and the data lines 505 have a width of 16 bits. However, various embodiments may have data reception registers and data lines of different widths, as determined by the system designer.

The operation of the adder 504 will be explained with respect to data from data reception register 501A (and therefore from source 402A), with the understanding that the adder 504 operates similarly for data from all other data reception registers.

Figure 5B:
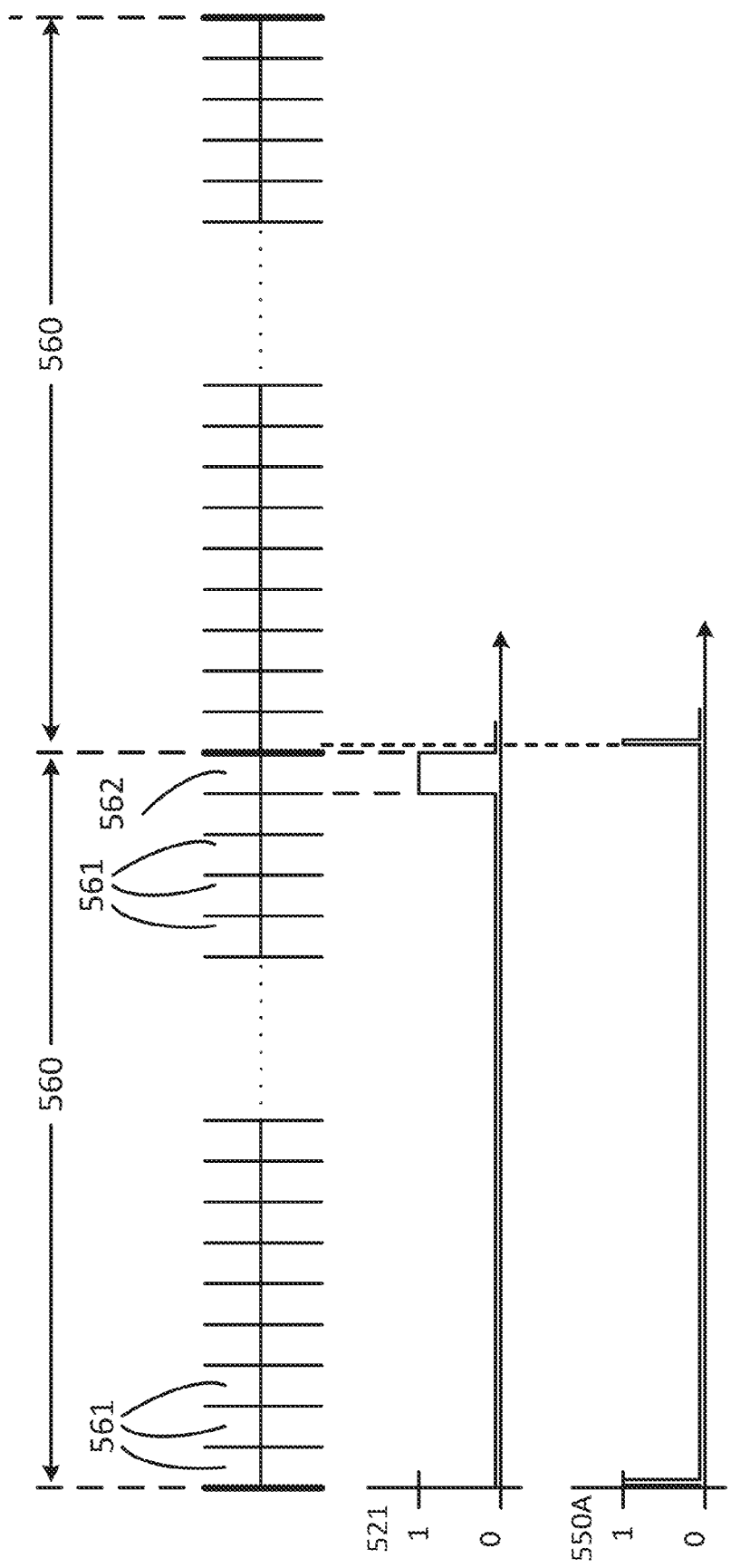
FIG. 5B schematically illustrates cycle, sub-cycle timing of the stimulus data system in FIG. 5A while in operation.

As a preliminary matter, the operation of the data storage apparatus 500 is cyclical, and includes a cycle (or "acquisition cycle") having a number of su b-cycles. More specifically, each acquisition cycle (560 in FIG. 5B) includes a number of sub-cycles (561, 562 in FIG. 5B), under control of state machine (or microprocessor) 550. Indeed, each acquisition cycle 560 includes at least two (and in a preferred embodiment, many more than two) summing sub-cycles 561, followed by a staging sub-cycle 562, as schematically illustrated in FIG. 5B. Each acquisition cycle 560 begins with a summing sub-cycle 561 which aggregates data in a summing buffer (e.g., 510 in FIG. 5A), and may include two or more, and even many hundreds or thousands of summing sub-cycles 561. Each acquisition cycle 560 ends with a staging cycle which aggregates data in a staging buffer (e.g., 511 in FIG. 5A). The summing buffer 510 and staging buffer 511 may be referred to as parts of buffer memory 502.

In a summing sub-cycle 561, the data lines 505 carry the data from data reception register 501A, via the multiplexer 503, to an input 504A of an adder 504. When the data reception register 502A is read during a clock cycle, it is immediately ready to receive new stimulus data from its associated source (402A) during the same clock cycle. Specifically, the data in the data reception register prior to the clock cycle is input to the adder 504, while new data takes its place in the data reception register. In other words, in a single clock period, the new data is not accumulated with previous data in the data reception register, but instead replaces that previous data.

For each item of data from the multiplexer 503 (i.e., each an item of data from a data reception register 501A), the adder 504 also receives accumulated previous data (i.e., accumulated from that data reception register 501A) from a corresponding memory location 510A in summing buffer 510, which is a random access memory, and is a component of the buffer RAM 502 of data storage apparatus 500. To that end, the summing buffer 510 has a data output 512B, is well as a data input 512A.

As such, the adder 504 produces cumulative (i.e., aggregated) data from that register (501A) at output 504C. That data is then written back to the corresponding memory location (510A) via data lines 525 and input 530A of multiplexer 530, such that the corresponding memory location stores the accumulated data from register 501A (and therefore from the source 402A). In some embodiments, the summing of data and writing back to the summing buffer occurs in a single clock period. Although the foregoing describes a data reception register, it should be noted that the process repeats for each data reception register (501X) so that the data from each such data reception register is eventually transferred to summing buffer 510.

It should also be noted that the summing buffer 510 has a many memory locations, each corresponding to one of the data reception registers (501X), and therefore each corresponding to one of the sources (402X). In this example, the adder 504 and the memory locations in summing buffer 510 have a width of 32 bits, although the data from the data reception registers is only 8 bits (501A) or 16 bits (501B) wide. As such, each memory location in the summing buffer 510 can accumulate several million items of data from its associated data reception buffer (e.g., in the case of 8-bit data $32-8=24$; $2^{}24=16,777,216$), even if each item of data is at its maximum (i.e., in the case of 8-bit data, $2^{}8-1=255$). Other embodiments may have different data widths for data reception buffers, adders and summing buffer memory locations, but the widths of the adder and summing buffer memory locations should be sufficient to accumulate the maximum value of the accumulated data from each of the data reception registers without overrunning before the data is read out of the summing buffer.

The foregoing process repeats for several sub-cycles 561 in each cycle 560. The last sub-cycle—staging cycle 562—however, is different. In the staging sub-cycle 562, the data from the adder 504 is not returned to the summing buffer 510. Rather, in the staging sub-cycle 562, the data from the adder 504 is written to staging buffer 511. Staging buffer 501 is a random access memory and has many of memory locations (511A, 511B, etc.), each memory location corresponding to one of the memory locations (e.g., 510A, 510B) in the summing buffer 510, and therefore corresponding to one of the data reception registers (501X). As such, each memory location (e.g., 511A) in the staging buffer 511 corresponds to a corresponding one of the sources (e.g., 402A), and stores the data accumulated from that source during the cycle 560. The staging buffer 511 has a data output 513B, is well as a data input 513A.

Also, when the data from the adder 504 is written to a memory location in the staging buffer 511, the corresponding memory location in the summing buffer 510 is cleared (i.e., written with "0" data). As such, each memory location in the summing buffer 510 is ready to revive the next item of data from its corresponding data reception buffer and to begin a new accumulation.

As such, at the end of the staging sub-cycle 562, each memory location (510X) in the summing buffer 510 is empty, and each corresponding memory location (511X) in the staging buffer holds the accumulated stimulus data from a corresponding one of the data reception registers (501X). As such, the data reception registers (501X) and the memory locations (510X) are ready to receive fresh stimulus data from the corresponding plurality of sources (402X) in a new (subsequent) acquisition cycle 560, while the memory locations of the staging buffer 511 hold the accumulated data from the previous acquisition cycle 560. In this way, the data storage apparatus 500 is configured to continuously receive stimulus data from the constellation of sources (402X), while storing previous data for transmission a local memory 524.

In this embodiment, the operation of the data storage apparatus 500 is controlled by a state machine 550. At the beginning of an acquisition cycle 560, the state machine 550 resets (via control signal 550A) a free-running 7-bit counter 555 so that the output of the counter 555 starts at the address of the first memory location (510A) of the summing buffer 510. As such, the counter 555 may be referred to as an address generator. In other embodiments, the state machine 550 may produce addresses itself (e.g., on address bus 519), in which case the system would not include the counter 555. It should be noted that the address data on address bus 509 is logically coupled to the state machine at interface 551. As such, in some embodiments the state machine 550 may generate address data on address bus 509. In some embodiments the state machine 550 may receive and assess address data on address bus 509, and analyze or monitor that address data to assess whether the system has reached the end of one of an operating cycle or sub-cycle, as explained below, such as the end of an acquisition cycle (560), or the end of a summing sub-cycle (561) for example.

in this example, the counter 555 produces a 7-bit output, corresponding to the number of memory locations in the summing buffer 510 (i.e., 2**7 memory locations, each having a width of 32 bits), and also corresponding to the number of memory locations in the staging buffer 511. In a this illustrative embodiment, the counter starts at binary 00000000 and increments once for each clock period, up to binary 11111111, and then starts at 00000000 again. As such, the counter (address generator) 555 produces 128 addresses during each sub-cycle (561, 562), and each sub-cycle (561, 562) has a duration of 128 clock cycles. Accordingly, a sub-cycle (561, 562) can read data from 128 sources via a 128 input multiplexer (503) and store aggregations of such data in 128 memory locations of a RAM buffer (510, 511). Other embodiment may have shorter or longer sub-cycles.

As the multi-bit output of the counter 555 advances (e.g., increments by one with each cycle of the clock 599), the output is synchronously (e.g., within the same clock cycle; effectively concurrently) provided to the write address input (515) and read address input (516) of the summing buffer 510, as well as to the write address input (517), as well as to the address input 503C to the multiplexer 503, all via address bus 519. As such, both the read addresses and the write addresses to the summing buffer 510, and the write address of the staging buffer 511, as well as the selection input 503C to the multiplexer 503, proceed in lock step, with each receiving the same address, thus assuring the coordination of the data accumulation and movement described above.

FIG. 53 schematically illustrates several acquisition cycles (560), each with several summing cycles (561) and a staging cycle (562). In operation, the write enable input 520 to the summing buffer 510 is tied to logic "1," so that the summing buffer 510 is always write-enabled. However, the write enable 521 to the staging buffer 511 is not fixed, but is controlled by the state machine 550. More particularly, the write enable 521 to the staging buffer 511 remains disabled (logic "0") except during a staging sub-cycle (562) of an acquisition cycle (560), during which the accumulated data is written to the staging buffer 511 (see FIG. 5B). As such, any data in the staging buffer 511 is not written-over during an acquisition cycle (560), except during the last sub-cycle 562. In this way, data in the staging buffer 511 may be transferred (e.g., to the local memory 324) at any time during a succeeding acquisition cycle (560) before the last sub-cycle 562 of that succeeding acquisition cycle (560).

Also during the staging sub-cycle 562 of an acquisition cycle 560, the state machine 550 controls the multiplexer 530, via signal 521, to couple to the summing buffer 510 "zero" data (i.e., data at input 530B of multiplexer 530, which is presented to the summing buffer is all logic "0"). In this way, as the memory write address advances at input 515, the memory locations of the summing buffer 510 are cleared. In other words, as data is written to the staging buffer 511, the summing buffer 510 is cleared.

When a processor 320 or other circuit reads the data from the staging buffer 511, the read address presented to the read address input (518) of the staging buffer 511 is under the control of the state machine 550. For example, in a preferred embodiment the state machine 550 produces and cycles through the addresses of the memory locations of the staging buffer 511 via address bus 552, which is logically coupled to the read address input (518) of the staging buffer 511, thereby causing the accumulated data in the staging buffer to pass to the bus 344.

The operation of data storage apparatus 500 during an acquisition cycle 560 is described in connection with the flow chart 600 in FIG. 6A, and the operation of a data storage apparatus during a sub-cycle 561 is also described in connection with the flow chart 610 in FIG. 6B, and during a sub-cycle 562 in flow chart 620 in FIG. 6C.

Figure 6A:
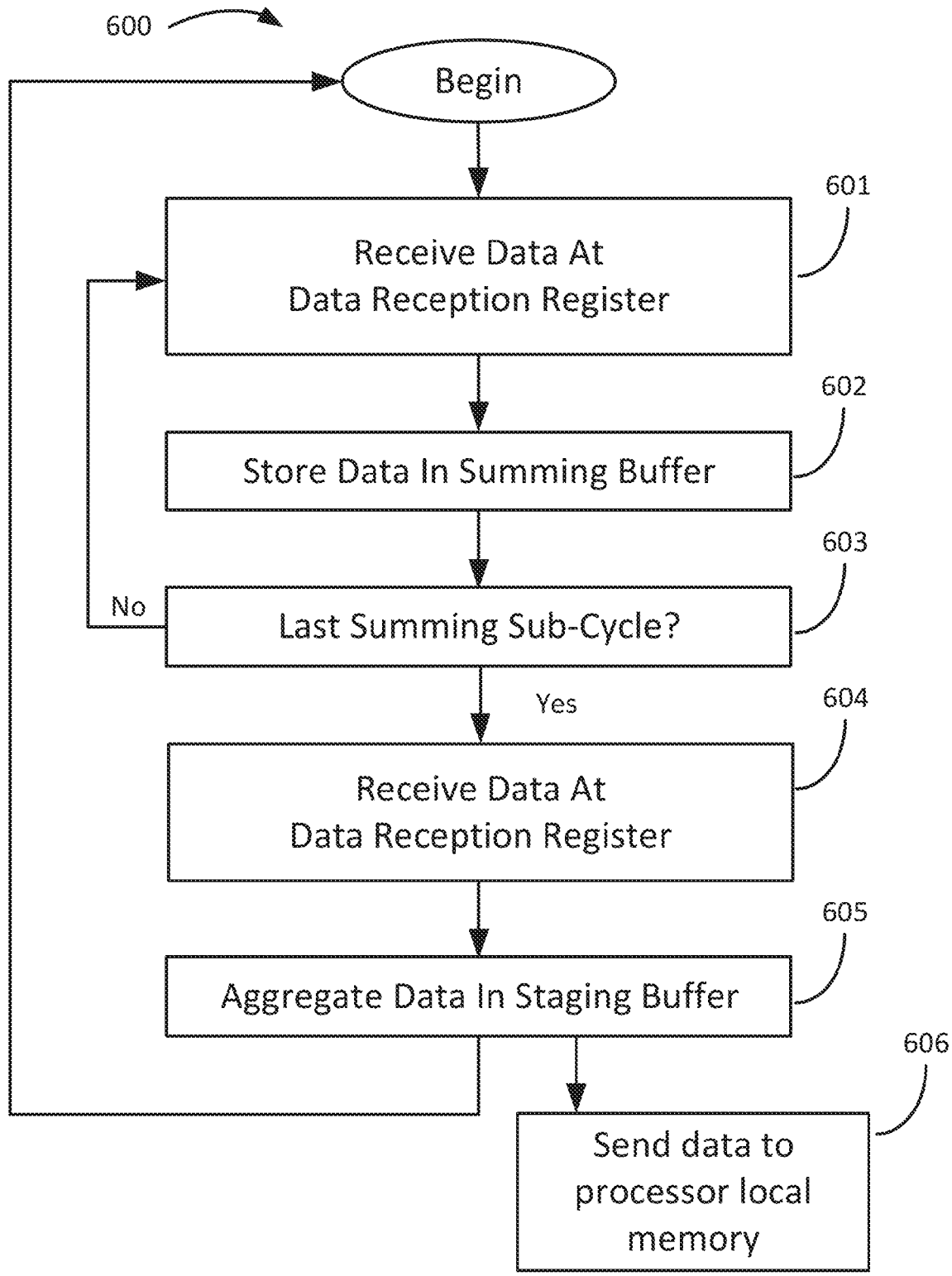
FIGS. 6A, 6B and 6C are flow charts illustrating the operation of an illustrative stimulus data system.

The process 600 of accumulating data during an acquisition cycle 560 is schematically illustrated in flow chart 600 in FIG. 6A, in which steps 601-603 represent a summing sub-cycle 561, and steps 604-605 represent a staging sub-cycle 562. At step 601, a reception register receives data from a source, and adds (or "accumulates") that data in a data reception register. At step 602, the data from each data reception register is periodically aggregated with previous data from that data reception register, and that aggregated data is written back into the summing buffer. The period depends on the number of inputs to the multiplexer 503. For example, if the multiplexer 503 has 128 inputs, then the sub-cycle period will be 128 clock cycles, since that is the number of clocks required to couple each multiplexer input to the multiplexer output 503B for a single clock cycle. In a preferred embodiment, each of the prescalers (501X) is read once during each summing sub-cycle (561) and once during each staging sub-cycle 562). In other words, steps 601 and 602 represent the actions taken for each prescaler sequentially during a sub-cycle.

At step 603, the method 600 determines whether it has reached the last sub-cycle (562) in the acquisition cycle (560). Although this is shown as a separate box in FIG. 6A, the determination in at stop 603 occurs prior to the storage of data in the summing buffer (510), so that the process can determine whether to proceed to the final sub-cycle (562) of the acquisition cycle (560) (step 604), or loop back to step 601 so as to begin a subsequent sub-cycle (561) within the acquisition cycle (560). If the acquisition cycle (560) has reached the last sub-cycle (562), data is received at the data reception registers at step 604, but is aggregated with previous data and written to the staging buffer (511) at step 605. At step 606, the aggregated data is sent to the processor local memory 324 beginning as early as the same time that the process 600 loops back to the beginning.

Figure 6B:
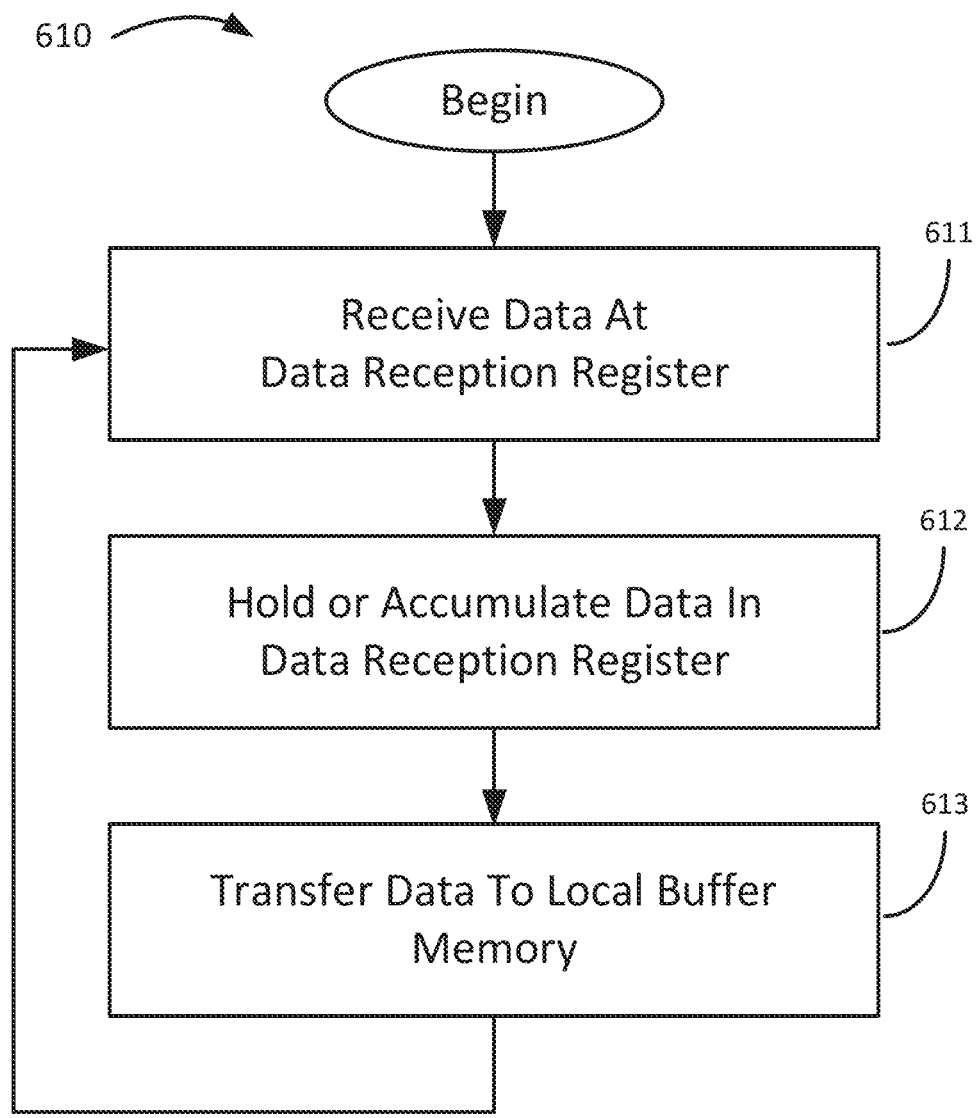
Figure 6C:
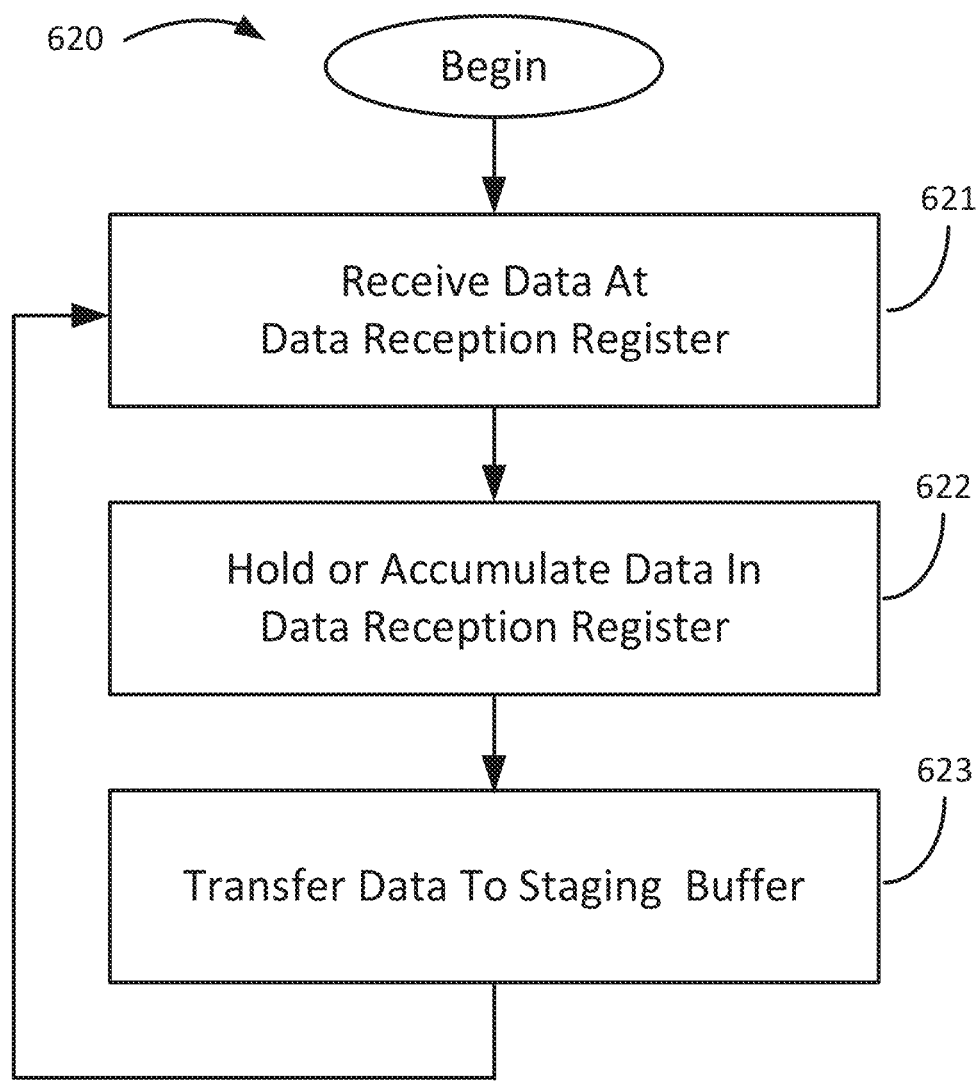

FIG. 6B is a flow chart that schematically illustrates the steps in a sub-cycle 561, and begins at step 611 with the receipt of data by the data reception registers (501X) as described above.

Each data reception register (501X) accumulates or stores its stimulus (step 612) until that data is transferred to the RAM 502 (e.g., transferred to a summing buffer 510), as described above. At step 613, the data from each data reception register (501X) is summed with previous data from that register and stored in the RAM 502 (e.g., in the embodiment of FIG. 5A, in the summing buffer 510). When the data in a data reception register (501X) is transferred to the RAM 502, the data reception register simultaneously receives (step 611) the first item of data in the subsequent sub-cycle (e.g., 561)

The operation of data storage apparatus 500 during a staging sub-cycle 562 of an acquisition cycle 560 is described in connection with the flow chart 620 in FIG. 6C, and begins at step 621 with the receipt of stimulus data at each of the data reception registers. Each data reception register (501X) accumulates or stores its stimulus (step 622) until that data is transferred to the RAM 502 (e.g., transferred to a staging buffer 511), as described above.

At step 623, the data from each of the data reception registers (501X) is summed with previous data from those registers (e.g., the previous data as stored in the summing buffer 510 as described, above), and stored in the in the staging buffer 511, as described above. Simultaneously with the writing of the accumulated data to the staging buffer, the memory locations of the summing buffer 510 are cleared, as described above.

Figure 7:
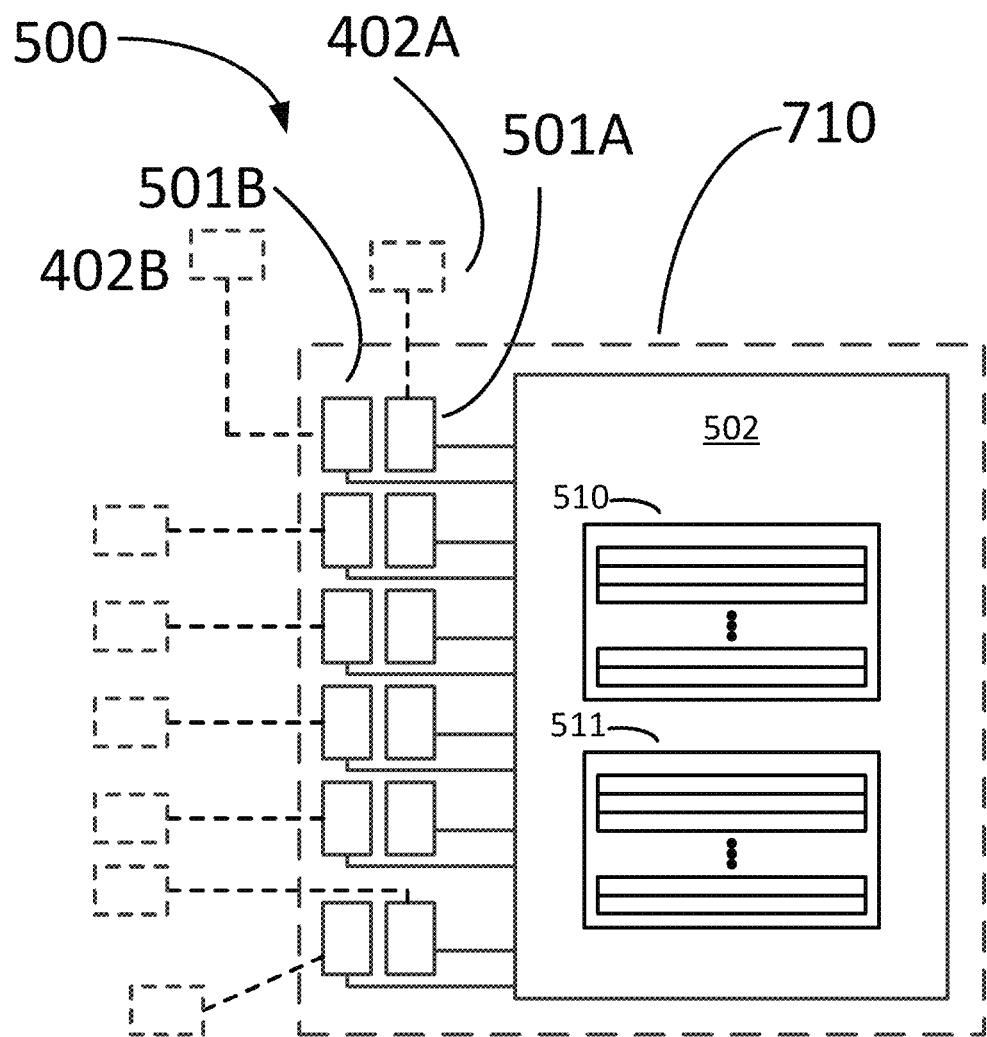
FIG. 7 schematically illustrates a layout for a elements of a stimulus data system.

In some embodiments the elements of a data storage apparatus (e.g., data storage apparatus 500) are centralized on an integrated circuit. Centralizing the elements may reduce the complexity of the routing of the data lines (e.g., 505) and control lines (e.g., 521) and address lines (e.g., 519) that interconnect the elements of the data storage apparatus. See, for example, FIG. 7.

To that end, in some embodiments, each of the data reception registers (501X) may be described as being physically closer to the buffer RAM 502 than to their respective sources (402X). In some embodiments, the data storage apparatus may be described as occupying real estate on an integrated circuit. As such, in some embodiments, the data reception registers (501X) and RAM 502 may be described as fitting within a perimeter (e.g., 710) on the integrated circuit, such that the data reception registers (501X) and RAM 502 occupy at least fifty percent of the real estate within the perimeter. In other embodiments, the data reception registers (501X) and RAM 502 occupy at least sixty percent, seventy percent, eighty percent, or even ninety percent of the real estate within the perimeter.

Various embodiments may be described as a stimulus data system 800, as schematically illustrated in FIG. 8. A stimulus data system 800 may include any of a variety of data reception modules 801. For example, a data reception module may include a number of data reception registers as described herein.

A stimulus data system 800 may also include any of a variety of memory modules, such as RAM 502 described herein or example. Some memory module 802 include a summing buffer and a staging buffer as described above, but other memory architectures may be employed in various embodiments. The memory module 802 may also include any of a variety of types of memory, such as SRAM for example.

In addition, a stimulus data system 800 may include any of a variety of controllers (or "control logic") 803. For example, the controller may be a state machine as described herein, or could be a microcontroller or microprocessor programmed to perform the functions described above (for example, the functions described in connection with state machine 550). The stimulus data system 800 may also include a processor interface module 804, configured to receive instructions from a processor (e.g., processor 320), and/or send data to a processor.

Definitions. As used in this description and the accompanying claims, the following terms shall have the meanings indicated, unless the context otherwise requires:

The phrase "logically coupled" when applied to two elements of a high-performance computer system means that digital data may be transmitted from one of the elements to the other. For example, two elements may be logically coupled when they both have access to a common data bus, and at least one of the elements can write to the data bus while the other elements reads from the data bus. Two memories may be logically coupled if they both have access to a common data bus under the control of a memory control circuit configured to cause a first memory to make data available on the common data bus, and to cause a second memory to read that data from the common data bus. As another example, two elements may be logically coupled through a multiplexer when one element is coupled to an input of the multiplexer and the other element is coupled to the output of the multiplexer, such that the element coupled to the input of the multiplexer can transmit data to the element coupled to the output of the multiplexer. Also, two elements may be logically coupled if there are one or more data lines extending from one of the elements to the other, to allow parallel or serial data transfer from at least one of the elements to the other.

The term "buffer" or "buffers" when applied to the function of a data reception register (prescaler) means that the data reception register may receive stimulus data and store that data until the data is read out of the data reception register, such as into a random access memory, for example. The term "buffer" or "buffers" may also include accumulating data with a data reception register. For example, a plurality of items of stimulus data may be summed or accumulated in a data reception register. In some embodiments, a data reception register is reset to zero, or set the value of a new item of data input the data reception register, when its data is read.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer processing system having a processer and a local memory logically coupled to the processor, the computer processing system comprising:
   a plurality of performance monitoring components distributed throughout the computer processing system;
   a statistics accumulation apparatus comprising:
      a plurality of prescalers, each of the plurality of prescalers logically coupled a corresponding one of the performance monitoring components; and
      a random access buffer memory having a plurality of memory locations, each of the plurality of memory locations corresponding to a corresponding one of the plurality of prescalers, the random access buffer memory separate from the local memory; and
   control logic coupled to the plurality of prescalers and to the random access buffer memory, the control logic configured to controllably transfer data from each of the plurality of prescalers to corresponding one of plurality of buffer memory locations,
   wherein the random access buffer memory comprises:
      a summing buffer comprising a plurality of summing buffer memory locations, each of the summing buffer memory locations corresponding to a corresponding one of the plurality of prescalers, the summing buffer configured to accumulate data from the plurality of prescalers; and
      a staging buffer comprising a plurality of staging buffer memory locations, each of the staging buffer memory locations corresponding to a corresponding one of the plurality of prescalers, the staging buffer configured to accumulate data from the plurality of prescalers and data from the summing buffer, and to provide that data to the processor, and
   wherein the prescalers buffer data between the plurality of performance monitoring components and the random access buffer memory.

2. The computer processing system of claim 1, wherein the control logic comprises a state machine.

3. The computer processing system of claim 1, wherein the processor further comprises a memory controller configured to read data from the buffer memory into the local processor memory.

4. The computer processing system of claim 1, wherein the random access buffer memory comprises a static random access memory.

5. The computer processing system of claim 1, wherein the plurality of prescalers and the random access buffer memory are disposed on a hub chip within a high performance computer system.

6. The computer processing system of claim 1, wherein each of the plurality of prescalers is physically closer to the random access buffer memory than to its corresponding one of the plurality performance monitoring components.

7. The computer processing system of claim 1, wherein each of the plurality of performance monitoring components is logically coupled to a corresponding one of the plurality of prescalers by a corresponding one of a plurality of dedicated data channels.

8. The computer processing system of claim 1, wherein the summing buffer has a summing buffer input and a summing buffer output, and wherein the staging buffer has a staging buffer input, the system further comprising:
   an input multiplexer having a plurality of inputs and an output, each of the plurality of inputs corresponding to a corresponding one of the plurality of performance monitoring components via a corresponding one of the prescalers; and
   an adder having a first adder input, a second adder input, and an adder output, the first adder input logically coupled to the multiplexer output, the second adder input logically coupled to the summing buffer output, and the adder output logically coupled to the staging buffer input and to the summing buffer input,
   wherein the adder is configured to sum data from one of the prescalers with corresponding data from the summing buffer, and to send the data to the summing buffer and to the staging buffer under control from the control logic.

9. The computer processing system of claim 8, further comprising a counter configured to synchronously supply address data to the summing buffer, the staging buffer, and the input multiplexer.

10. A method for operating a computing system, comprising:
- generating performance data from a plurality of performance monitoring components;
- buffering the performance data in a corresponding plurality of prescalers;
- during a first phase of operation within an acquisition cycle, transferring the performance data from the plurality of prescalers to a corresponding plurality of memory locations within a random access buffer memory that comprises a summing buffer and a staging buffer, by;
    - summing the performance data from the plurality of prescalers with data from a corresponding plurality of memory locations within the summing buffer to produce a plurality of aggregated data; and
    - writing the plurality of aggregated data back to the corresponding plurality of memory locations;
- during a second phase of operation within the acquisition cycle that follows the first phase, transferring the performance data from the plurality of prescalers to a corresponding plurality of memory locations within the staging buffer; and
- transferring the performance data from the plurality of memory locations within the staging buffer to the processor local memory, wherein the processor local memory is separate from the random access memory.

11. The method for operating a computing system according to claim 10, wherein summing the performance data and writing the plurality of aggregated data back to the corresponding plurality of memory locations occurs within a single clock period.

12. A computer processing system having a central processing unit comprising a processor and a plurality of performance monitoring components distributed throughout the computer processing system, the system further comprising data storage means comprising:
- means for receiving stimulus data from the plurality of performance monitoring components;
- memory means for accumulating stimulus data from the plurality of performance monitoring components via the means for receiving stimulus data, the memory means comprising a summing buffer means having a plurality of summing memory locations, each of the memory locations corresponding to one of the plurality of performance monitoring components, and a staging buffer means having a plurality of staging memory locations, each of the staging memory locations corresponding to a corresponding one of the plurality of means for receiving stimulus data, the staging buffer means configured to accumulate data from the plurality of means for receiving stimulus data and data from the summing buffer means, and to provide that data to the processor; and
- control means coupled to the means for receiving stimulus data and to the memory means, the control means configured to controllably transfer data from the means for receiving stimulus to the memory means;
- wherein the means for receiving stimulus buffers data between the plurality of performance monitoring components and the memory means.

13. The computer processing system of claim 12, wherein the control means comprises a state machine.

14. The computer processing system of claim 12, wherein the means for receiving stimulus data and the memory means are disposed on a hub chip within a high performance computer system.

15. The computer processing system of claim 12, wherein the summing buffer means has a summing buffer means input and a summing buffer means output, and wherein the staging buffer means has a staging buffer means input, the system further comprising:
- an input multiplexer means having a plurality of inputs and a multiplexer output, each of the plurality of inputs corresponding to a corresponding one of the plurality of performance monitoring components; and
- an adder means having a first adder input, a second adder input, and an adder output, the first adder input logically coupled to the multiplexer output, the second adder input logically coupled to the summing buffer means, and the adder output logically coupled to the staging buffer input and to the summing buffer input,
- wherein the adder means is configured to sum data from one of the means for receiving stimulus data with corresponding data from the summing buffer means, and to send the data to the summing buffer means and to the staging buffer means under control from the control means.

16. The computer processing system of claim 15, further comprising an address generation means configured to synchronously supply address data to the summing buffer means, the staging buffer means, and the input multiplexer means.

\* \* \* \* \*